United States Patent [19]

Roehr

[11] 4,418,745
[45] Dec. 6, 1983

[54] APPARATUS FOR HEATING PERSONS TRAVELLING IN OR ON OPEN VEHICLES HAVING INTERNAL COMBUSTION ENGINES

[76] Inventor: Oskar W. K. Roehr, Windmühlenstieg 15, 2000 Hamburg 52, Fed. Rep. of Germany

[21] Appl. No.: 252,068

[22] Filed: Apr. 8, 1981

[30] Foreign Application Priority Data

| Oct. 11, 1980 [DE] | Fed. Rep. of Germany | 8027178 |
| Oct. 15, 1980 [DE] | Fed. Rep. of Germany | 8027524 |
| Oct. 7, 1980 [DE] | Fed. Rep. of Germany | 8029729 |
| Nov. 25, 1980 [DE] | Fed. Rep. of Germany | 8031329 |

[51] Int. Cl.³ ............................................. B60H 1/18
[52] U.S. Cl. ..................................... 165/46; 126/204; 165/44; 165/51; 237/12.1
[58] Field of Search .................. 126/204; 165/46, 44, 165/41, 51; 237/12.3 A, 12.1

[56] References Cited

U.S. PATENT DOCUMENTS

| 2,540,547 | 2/1951 | Rodert | 165/46 X |
| 2,930,594 | 3/1960 | MacCracken | 165/46 X |
| 3,468,299 | 9/1969 | D'Amato | 126/204 |
| 3,738,367 | 6/1973 | Hardy | 165/46 X |
| 3,743,012 | 7/1973 | Laxo | 165/46 X |
| 3,744,053 | 7/1973 | Parker et al. | 165/46 X |
| 4,067,064 | 1/1978 | Cerniway et al. | 126/204 X |
| 4,347,893 | 9/1982 | Moyer | 165/44 |

FOREIGN PATENT DOCUMENTS

| 571398 | 5/1924 | France | 237/12.3 A |
| 501717 | 11/1954 | Italy | 126/204 |
| 502345 | 11/1954 | Italy | 126/204 |

*Primary Examiner*—Sheldon J. Richter
*Attorney, Agent, or Firm*—Toren, McGeady and Stanger

[57] ABSTRACT

The invention relates to an apparatus for heating persons travelling in or on motorcycles or motor vehicles having internal combustion engines, particularly open motor vehicles, racing vehicles or rail vehicles, particularly working vehicles or working on ships, floating drilling platforms, etc. comprising a hot air generator supplied with the waste heat of the internal combustion engine and an article of clothing connected to said generator by means of a flexible line and by means of which hot air can be supplied to the person wearing the clothing.

22 Claims, 10 Drawing Figures

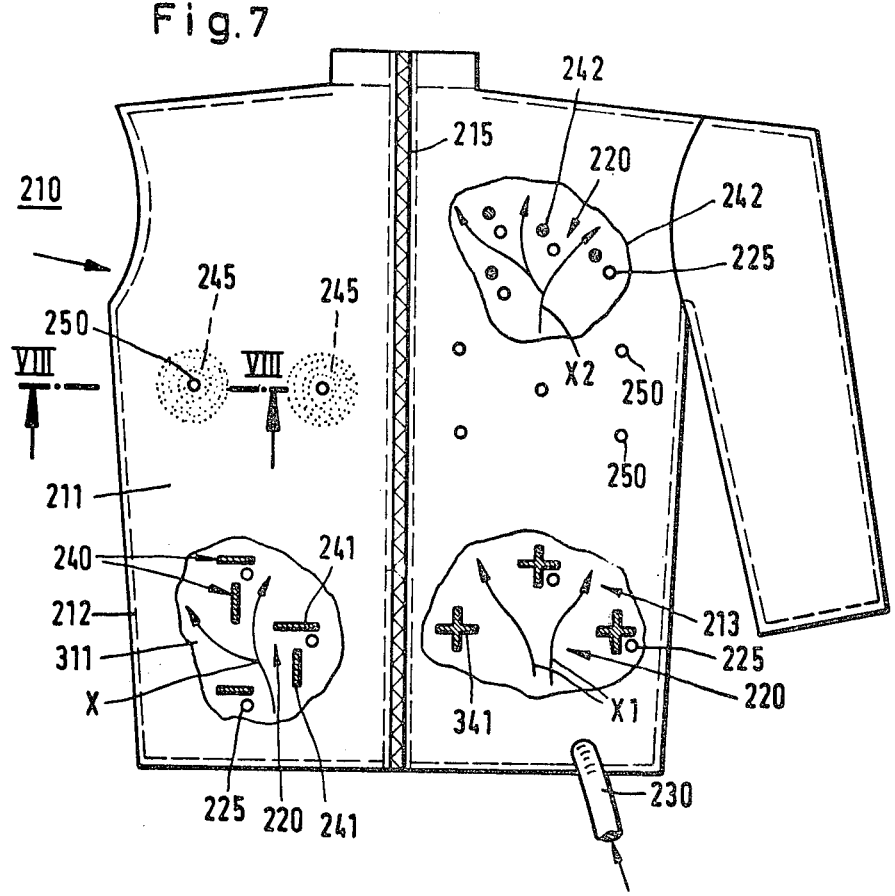

APPARATUS FOR HEATING PERSONS TRAVELLING IN OR ON OPEN VEHICLES HAVING INTERNAL COMBUSTION ENGINES

BACKGROUND OF THE INVENTION

The invention relates to an apparatus for heating persons travelling in or on motor vehicles or motorcycles having internal combustion engines, particularly open vehicles, or watercraft or rail vehicles, particularly working vehicles and those working on ships, floating drilling platforms, etc.

When riding motorcycles and travelling in open motor vehicles, there is the disadvantage that the persons travelling are exposed to the air stream which can be prejudicial to the health as a result of excessive cooling. To prevent this, people travelling in this way wear special clothing completely covering the body and which is wind-tight. However, the disadvantage then exists that as a result of the air-tight shielding of the body surface, there is no longer a moisture exchange from the skin to the ambient. Thus, there is build up of moisture which, even after a relatively short travelling time, causes a partial moistening of the articles of clothing located between the body surface and the windproof clothing which, besides feeling unpleasant, can be a source of chills.

In addition, it is in particular the back and chest areas of the travelling person which are cooled first, so that the respiratory tracts, lungs and kidneys are the first to suffer. The closely fitting protective clothing, particularly worn by motor cyclists does not permit an adequate circulation between the wearer and the clothing, which can impair the motor cyclist's concentration, so that at ever increasing intervals, he must stop to obtain fresh air by opening the clothing.

A large number of different designs of protective clothing, e.g. for persons working in the open air and in winter are known. Thus, protective clothing is known in which heat-transferring, liquid-traversed coiled hoses or tubes are fixed thereto, said tubes being individually or in grouped manner freely movable in holding means comprising ducts. As in this known construction the tubes can move freely in the holding means and the complete tube system is movable in concertina-like manner when the wearer moves due to the wound arrangement of the tubes, such protective clothing provides the wearer with maximum freedom of movement. (DOS No. 1,610,647).

In addition, a heatable, fabric-like product and a heatable suit made therefrom is known constructed in such a way that the woven areas are separated from one another by woven-in longitudinal portions of flexible tubes or hoses for carrying a fluid heat carrier. The tubes extend exclusively in one direction of the woven product and in alternating manner on the top and bottom of the product individual yarns or threads or groups of yarns or threads run transversely over the tubes, the latter extending in the direction of the warp threads which are comparatively inextensible, whereas the weft threads are comparatively highly extensible. As the tubes or hoses engage tightly with the wearer's body due to the special construction of this known product from which the suit is formed there is a direct heat transfer of the circulating heat carrier to the trunk by heat conduction. A suit constructed in this way is particularly intended as underclothing for diving suits or the like (DOS No. 1,908,742).

The known protective clothing is difficult to make.

BRIEF SUMMARY OF THE INVENTION

The problem of the present invention is to provide an apparatus making it possible to heat the body, particularly certain parts thereof such as the back and chest of a motor cyclist or persons travelling in open vehicles, which is simple and economic to manufacture.

According to the invention, this problem is solved by an apparatus of the aforementioned type, wherein it comprises:

(a) a hot air generator supplied by the waste heat of the internal combustion engine or which is independent of such internal combustion engine; and (b) an article of clothing such as a jacket, parka, overall, overcoat, etc. having a hot air-carrying duct system comprising a plurality of air ducts with air outlets on the side facing the person wearing the clothing and outlet air openings, as well as a flexible line connected to the hot air generator and which is constructed in double-layer manner, the two shells or layers of the article of clothing being zonally interconnected for forming the air ducts and made from air-tight, thermally stable material, particularly plastics foil.

The apparatus according to the invention is able to provide a warming action for persons travelling on or in motorcycles or open vehicles for the most varied reasons or who work on ships, floating drilling platforms, etc., whereby thus avoiding the unpleasant effects which would otherwise occur.

The article of clothing constructed in this way can be connected to any hot air generator, no matter whether the hot air is produced by the exhaust heat of the engine or a motor vehicle or by an electric hot air blower. It can be used for vehicles of all types in which the driver or passenger are unprotected, such as motorcycles, open motor vehicles, tractors, building and construction vehicles, watercraft such as motor boats and yachts, as well as rail vehicles. The clothing can be in one piece and consist of trousers and jacket, but can also be in the form of a jacket, parka or overcoat.

According to a particularly advantageous development of the invention an inner part for the clothing is proposed, which gives the possibility of providing a heating action for persons travelling on motorcycles or in open motor vehicles for the most varied purposes, thereby avoiding the unpleasant effects which could otherwise occur. The use of the inner part is particularly advantageous and in the same way as an inner lining can be detachably arranged, i.e. buttoned-in a corresponding article of clothing. In addition, the possibility exists of wearing the present inner part under an article of clothing such as a jacket, parka, overcoat, etc., so that persons travelling in or on such vehicles do not have to wear the special expensive protective clothing. The inner part is put on before the usual clothing or is connected thereto beforehand by means of press buttons or studs or zip fasteners. Thus, this inner part provides an apparatus for heating persons, which is inexpensive and uncomplicated as regards manufacture. The specially constructed inner part can be connected to any heat generator, no matter whether the hot air is provided by the exhaust heat of a vehicle engine or by an electric hot air-blower. It can be used in connection with vehicles of all types in which the driver or passenger are unprotected, such as motorcycles, open motor vehicles, tractors, building vehicles, watercraft such as motor boats and yachts, ships, floating drilling platforms, etc., as well as rail vehicles. Furthermore, the inner part can be provided with connecting means making it possible to connect the hot air-carrying duct system of the inner part to hot air-distributing means inside a protective helmet or gloves.

The invention also proposes a double-walled article of clothing with an inner layer and an outer layer of weldable or heat-sealable plastics foil or a fabric lined with plastics foil, the two layers being heat-sealed at their edges, whilst forming a closed inner area and whilst forming a hot air-carrying duct system from a plurality of interconnected air duct-like portions in its inner area, which are heat-sealed together in sections or in punctiform manner. One of the two layers is connected with a hot air supply connection issuing into the inner area, whilst the clothing inner layer facing the wearer has air outlets. Thus, an article of clothing is provided permitting hot air distribution over the parts of the body covered by it, which does not inflate by any significant extent by introducing or blowing in hot air and which even permits an interruption of the hot air conveyed within the article of clothing when portions therefore are compressed on sitting, so that the hot air supply in the inner area of the clothing to other air outlets is in no way impaired.

The special construction of the hot air-carrying duct system in the inner area of the clothing on the one hand prevents an unnatural inflation of the clothing on blowing or forcing in hot air. On the other hand, the zonally arranged welds interconnecting the inner and outer layers give the clothing a certain strength and durability. Air outlets are provided in the clothing layer facing the body of the wearer, so that the hot air escaping from the inner area of the clothing contributes to a uniform heating of the parts of the body covered by it.

As a further development of the invention, it is particularly advantageous that through-openings are provided in the connecting areas of the welded portions for the two layers, whilst maintaining closed, annular welds, so that there can be no moisture build-up in the area between the article of clothing worn and the wearer's body. The positioning of the air outlets adjacent to or in the vicinity of the welds which zonally interconnect the two layers of the clothing also leads to the advantage that these welded areas contribute to a certain stiffening and stabilisation of the adjacent areas, so that the air outlets cannot be closed by the displacement of the inner layer of the article of clothing.

Further advantageous developments of the invention can be gathered from the subclaims.

BRIEF DESCRIPTION OF THE DRAWINGS

The invention is described in greater detail hereinafter relative to non-limitative embodiments and the attached drawings, wherein show:

FIG. 7 another embodiment of an article of clothing provided with a hot air-carrying duct system in a view from the front, the outer layer of the article of clothing being zonally removed.

FIG. 8 a larger-scale, cross-section along line VIII—VIII of FIG. 7.

FIG. 9 a portion of the article of clothing with two air duct-like sections and the air outlets in a diagrammatic view.

FIG. 10 the hot air supply connection connected to the article of clothing, partly in elevation and partly in vertical section.

DETAILED DESCRIPTION OF THE PREFERRED EMBODIMENTS

Figures 1, 2:
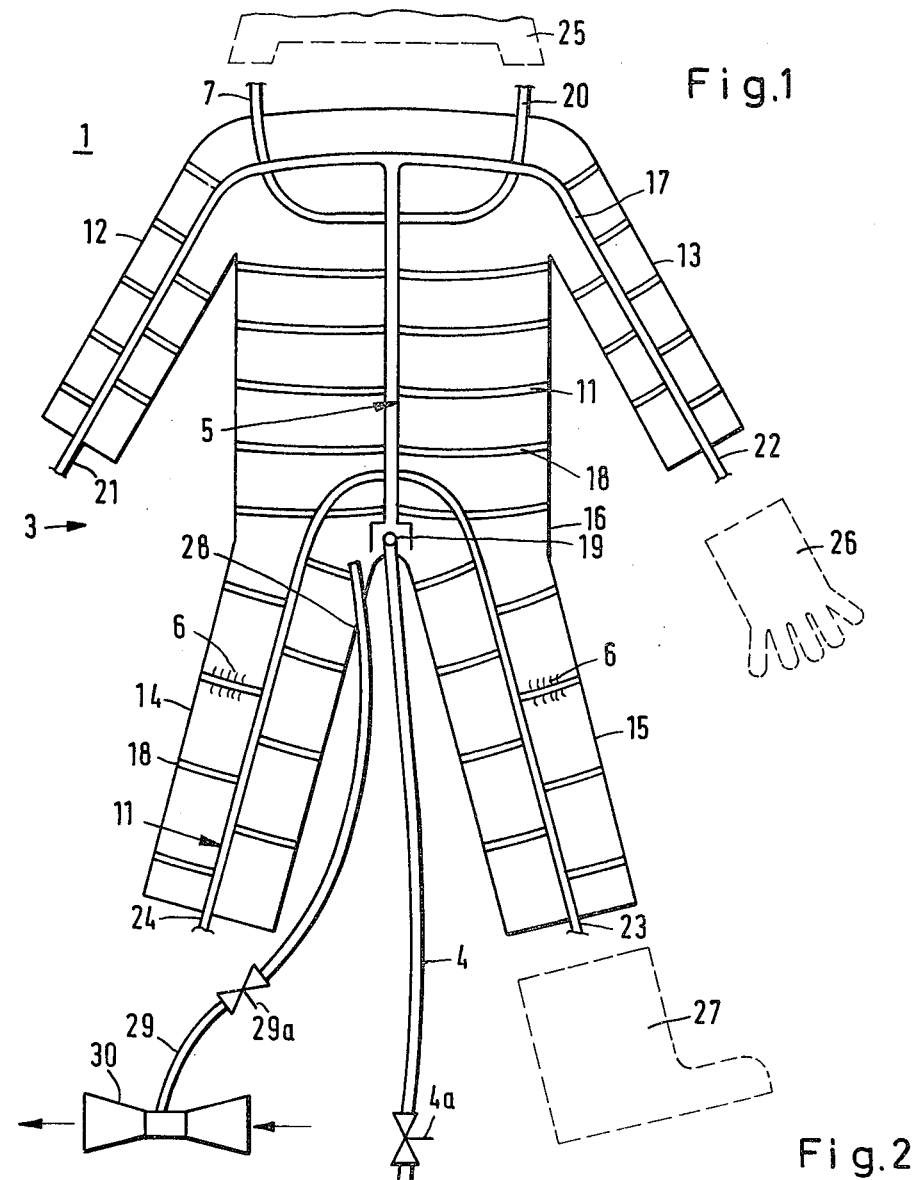
FIG. 1 a diagrammatic view of the apparatus according to the invention.
FIG. 2 a transverse sectional view of the hot air generator of the apparatus of FIG. 1.

FIG. 1 shows an article of clothing 3 into which is integrated a duct system 5. Duct system 5 is connected by means of a flexible line 4 with a hot air generator 2 constructed as a heat exchanger 10. Heat exchanger 10 is positioned on an exhaust pipe 9, which is connected to a cylinder 8 of an internal combustion engine.

According to FIGS. 1 and 2, heat exchanger 10 comprises two half-shells 31, 32 pivotable about a hinge 33 and interconnectable by means of a clamping device 34. For fixing the heat exchanger 10, the half-shells 32, 31 are opened and moved over exhaust pipe 9. The half-shells 31, 32 can then be closed and interconnected by means of the clamping device 34. A conical assembly 35, constituted by two segments 41, 42 and open in the vehicle travelling direction is formed on heat exchanger 10. Each of these two segments 41, 42 is associated with one of the half-shells 31, 32. Conical assembly 35 guides inflowing ambient air into an intake chamber 43 and up to the terminal portion 36 of heat exchanger 10 in which a deflection area 37 is formed. The air flowing in through intake chamber 43 is deflected by 180° in deflection area 37 and is then passed through a deflection chamber 39. Chamber 39 contains heat exchanger ribs 38, in part fixed to the surface of deflection chamber 39 and in part have openings and additionally engage on exhaust pipe 9, whilst forming a heat-carrying connection. Deflection chamber 39 with heat exchanger ribs 38 also comprises two portions 39a, 39b, each of which is associated with one of the half-shells. An outlet connection 44 is formed at the outlet of deflection chamber 39 in the vicinity of the conical inlet 35. Flexible line 4 for connecting the heat exchanger 10 to the article of clothing 3 is fixed to connection 44.

The end of flexible line 4 remote from heat exchanger 10 is fixed to a connecting piece 19, which is connected to the duct system 5 of clothing 3. Clothing 3 contains a main duct 17, which extends from connecting piece 19 through central portions 16, arm portions 12, 13 and leg portions 15, 16 of clothing 3. Approximately at right angles to main duct 17 distribution ducts 18 are formed at intervals having air passage openings 6 directed towards the body of the person wearing the clothing 3.

Clothing 3 also has connecting pieces 20, 21 22, 23, 24 for connecting the duct system 5 to the helmet 25, gloves 26 and boots 27. The connection can be by means of not shown, short flexible pipe sections.

Figure 6:
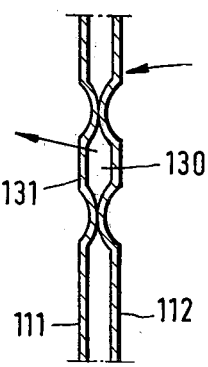
FIG. 6 a vertical section through the double-layered inner part.

Duct system 5 can be formed in different ways within the article of clothing 3. Thus, clothing 3 can be made from an outer and an inner shell, said two shells 111, 112 being zonally interconnected whilst forming air ducts 11 (FIG. 6). The connecting webs between shells 111, 112 can have different spacings. It is also possible to form the duct system 5 in hose-like manner on the inside of clothing 3. The air supplied to clothing 3 flows out through outlet air openings 7.

It is also possible to construct the duct system 5 in such a way that heat exchanger 10 is connected to a supply duct arrangement, an outlet air duct arrangement being formed so as to overlap it in clothing 3. In this case, it is advantageous to connect the outlet air duct arrangement on the outside with an outlet air connection 28 passing through clothing 3.

In order to increase the air exchange between the clothing and the body surface, the outlet air duct arrangement or the outlet air opening 6 can be connected to a vacuum-producing means. The latter is appropriately constructed as an outlet air injector subject to the action of the air stream. As a result of the vacuum formed in injector 30 outlet air can be sucked from the outlet air duct arrangement by a flexible line 29 arranged between connection 28 and injector 30.

In order to facilitate handling and use of apparatus 1 according to the invention, it is also appropriate to provide the flexible tubes 4, 29 with high-speed connecting means permitting a rapid fixing and detaching of tubes 4, 29 with respect to connecting piece 19 and outlet connection 44 or outlet air connection 28. Distributor connections can also be provided on outlet connection 44 and outlet air injector 30 to enable a number of persons to be simultaneously connected to heat exchanger 10 and injector 30. As a result, it is also posssible to provide pillion riders on motorcycles and passengers in open vehicles with clothing 3 and connect them to heat exchanger 10.

At 4a, and 29a it is possible to provide shut-off valves in flexible tubes 4, 29 making it possible for the clothing wearer to regulate the quantity of hot air supplied and also interrupt the hot air supply if body heating is not required. The shut-off valves 4a, 29a can also be provided with an outside air supply connection and can be constructed as a control member in such a way that the temperature of the hot air supplied is regulatable and can consequently be adapted to the in each case desired heating temperature. Furthermore, tubes 4, 29 can be equipped with coupling members at their ends connected to the hot air generator to permit an effortless connection to the latter. The connecting members can also be constructed in such a way that on detaching the same an outflow of hot air from the connecting piece of the hot air generator is automatically avoided. The connecting members on tubes 4, 29 can also be constructed in such a way that it is possible to connect to any hot air generator, such as e.g. hot air outlet nozzles on motor vehicles.

To ensure an air supply to duct system 5 when the motorcycle or vehicle is stationary, a blower 45 can be placed on the air intake of the hot air generator 2. In the case of the heat exchanger 10 shown in FIG. 1, blower 45 is arranged in the conical air intake 35. Blower 45 is constructed in such a way that it need only be operated when the vehicle is stationary, whereas when travelling air building up in front of heat exchanger 10 is passed into the conical intake 35. When travelling, blower 45 can be disconnected. It is advantageous to equip blower 45 with a regulating device, so that the delivery rate for blower 45 is adjustable, e.g. by speed regulation. Thus, at low travelling speeds, the blower 45 can be put into operation with a throttled speed in such a way that due to the injection action additional air can be drawn through the free-cross-section of conical intake 35.

Figure 3:
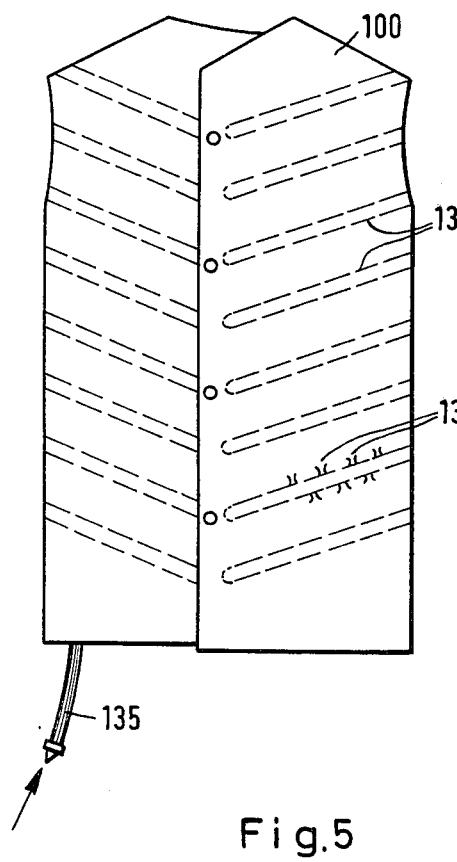
FIG. 3 a front view of a sleeveless inner part for the article of clothing with a hot air-carrying duct system.
Figure 4:
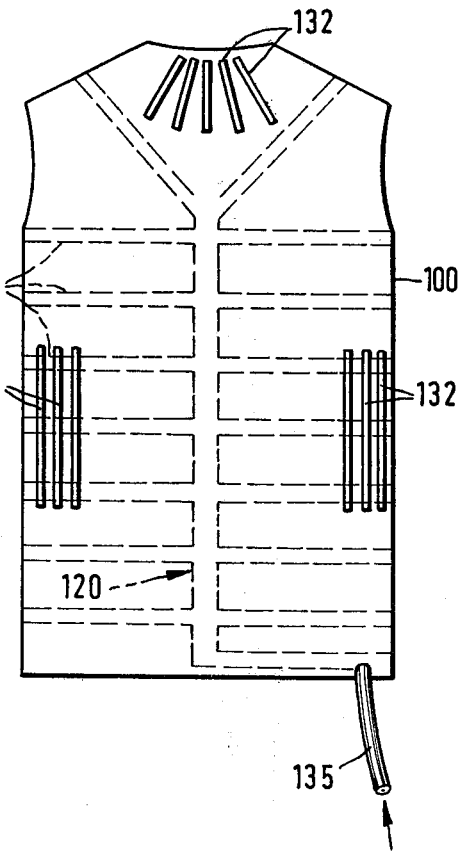
FIG. 4 a rear view of the inner part.

FIGS. 3 and 4 show an article of clothing in the form of an inner part 100 into which is integrated a duct system 120. Duct system 120 is connectable by means of a flexible hot air supply line 135 with a hot air generator constructed as a heat exchanger and not shown in the drawings. The heat exchanger can be arranged on an exhaust pipe connected to the cylinder of an internal combustion engine.

The inner part 100, which is advantageously sleeveless, is in double-layer form, said layers 111, 112 being zonally interconnected for forming a plurality of air ducts 130 constituting the duct system 120. Furthermore, the two layers 111, 112 of inner part 100 are made from air-tight, thermally stable material, particularly plastics foil, so the possibility is provided of constructing the individual air ducts 130 of the hot air-carrying duct system 120 by applying appropriate welds, as a result of which the two layers 111, 112 of inner part 100 are interconnected. However, it is also possible to construct the air ducts 130 in other ways.

Figure 5:
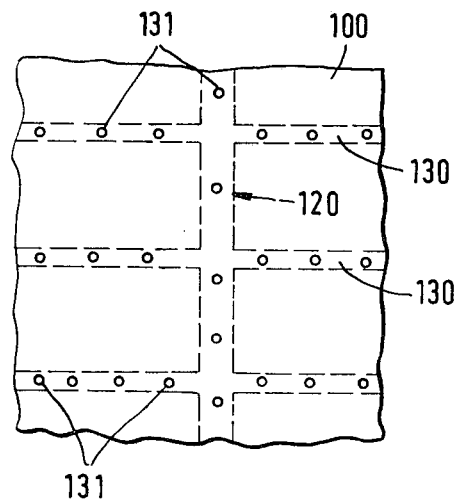
FIG. 5 a portion of the inner part with the hot air-carrying duct system.

The air ducts 130 are provided with a plurality of air outlets 131, which are formed in the particular layer of inner part 100 which faces the wearer's body (FIG. 5). Inner part 100 is also supplied with air outlet openings 132 into which issues certain of the air ducts 130 to permit the carrying off of excessive hot air.

The air ducts 130 formed between the two layers 111, 112 of inner part 100 are constructed in hose-like manner. A shut-off valve, not shown in the drawings, can be provided in the flexible hot air supply connection 135 and enables the clothing wearer to regulate the quantity of hot air supplied and also to interrupt the hot air supply if body heating is not required. The shut-off valve can also be provided with an outside air supply connection and can be controllable in such a way that the hot air can be mixed with cold air so as to provide a pleasant temperature for the wearer.

Inner part 100 can be provided in per se known manner with a connecting device, not shown in the drawings, so that inner part 100 can be fixed e.g. in inner lining-like manner into an article of clothing such as a jacket, parka, overcoat, etc. The fastening device can be in the form of press buttons or studs or zip fasteners or other suitable connecting means.

It is also possible to provide inner part 100 with sleeves and leg portions, which are also constructed in double-layer form and also have a plurality of air ducts integrated into the overall duct system 120 of the inner part.

A quick-acting valve can be provided in the flexible supply line 4, which prevents a return flow of hot air from the duct system if outlet air openings 32, 132 are simultaneously closed. As the hot air which flows in under a certain pressure inflates the duct system, an article of clothing (inflated) in this way can at the same time protect the wearer if, for example, he crashes when riding a motorcycle.

The article of clothing 210 shown in FIG. 7 is made in the form of a jacket. It can be made with or without sleeves. The article of clothing can be closed at the front by means of a zip fastener indicated at 215, but it is also possible to use other connecting means such as button or press stud strips or the like.

Clothing article 210 is constructed in double-walled manner from two layers, namely an outer layer 211 and an inner layer 311, the latter facing the wearer's body. The two layers 211, 311 are made from a weldable or heat-sealable plastics foil or a fabric lined with a plastics foil.

Whilst forming a closed inner area 213, the two layers 211, 311 are edge-welded at 212. A hot air-carrying duct system 220 formed from a plurality of interconnected air duct-like portions 221 is constructed in inner area 213. These air duct-like, cohesive portions 221 are formed by the zonal or punctiform welding together of the two layers 211, 311. As the two layers 211, 311 of article of clothing 210 are made from a weldable plastics foil or a fabric lined with a weldable plastics foil, it is possible without difficulty to zonally weld together the two layers 211, 311.

The welds 240 are applied in such a way that a cohesive, hot air-carrying duct system 220 is formed.

The zonal welding or heat-sealing of the two layers 211, 311 of clothing 210 can take place in punctiform manner, as indicated at 242 in FIG. 7. These punctiform or spot welds are then formed in an approximately columnar manner. However, FIG. 7 shows a differently formed welded zone 240, e.g. in the form of webs as indicated at 241. These web-like welds 240 are staggered relative to one another, so that the air guided through the inner area 213 of clothing 210 can flow in the direction of arrow X, XI and X2. However, the weld webs 241 can also be constructed in cross-like manner, as indicated at 341 in FIG. 7. Here again, there is advantageously a displaced arrangement and association of the cross webs.

The hot air is supplied to the inner area 213 of article of clothing 210 via a hot air supply connection 230, constructed as a flexible hose and connected to a hot air generator constructed in per se known manner and not shown in the drawing. The hot air generator can be constructed as a heat exchanger connected to the internal combustion engine of a vehicle or motorcycle. A blower can be used for forcing hot air through the hot air supply connection 230 into the inner area 213 of the clothing 210.

The connection of the hot air supply connection 230 to one of the two layers 211, 311 of article of clothing 210 is shown in FIG. 10. Connection 230 is connected to the inner area 213 of clothing 210 in the vicinity of outer later 211, but there can also be a connection to the inner layer 311 of the clothing. Hot air is supplied through the hot air supply connection 230 in the direction of arrow Y.

To prevent excessive heating of the plastics foil layer facing the hot air supply connection area where the hot air flows into the inner area 213 of clothing 210, both the inner wall surface of layer 311 and the inner wall surface of layer 211 in the connecting area 211a of the supply connection 230 are provided with an insulating covering 235 (FIG. 10). These insulating coverings 235 can be constructed in such a way that they simultaneously have a stiffening action, so that a compression of the facing wall surfaces of the two layers 211, 311 in the connection area 211a of the hot air supply connection 230 is avoided and as a result there is no deterioration of the hot air supply in such situations. In order to maintain the spacing between the two wall surfaces of layers 211, 311 one of the two insulating coverings can be provided with a spacing member 235a, so that even when the two layers 211, 311 are pressed together, the through-flow of hot air from the hot air supply connection 230 into inner area 213 of clothing 210 is ensured.

In order to be able to supply the hot air fed into the inner area 213 of clothing 210 to the parts of the wearer's body covered by this clothing the inner layer 311 thereof has air outlet openings 225 distributed over the entire surface of layer 311 in the vicinity of the air duct-like portions 221. So as not to in any way reduce the air outflow through the air outlet openings 225, the latter are provided adjacent to or in the vicinity of welds 240, which can also be constructed as reinforcing webs (FIGS. 7 and 9).

In order to permit an air balance with the external air between the parts of the body to be heated and the worn clothing 210, according to a further embodiment (cf FIGS. 7 and 8), openings 250 are provided in the connection areas of welds 240 which are formed in the vicinity of the latter in such a way that closed, annular welds 245 are retained adjacent to the individual openings 250, thereby maintaining the action of the welded portions 240. However, at the same time, venting/ventilating openings are formed, so that there can be no further build-up of moisture in the inner area between the worn article of clothing and the body. The article of clothing 210 is double-walled throughout and if arm and leg portions are provided, they are also double-walled. An inflation effect is avoided by the welded portions 240 or 241 or 242 connecting the two foils of the inner and outer layers 211, 311 of the article of clothing. The hot air blown into the inner area 213 of clothing 210 can, in spite of these welds 240, spread over the entire inner area 213 of clothing 210 and as a result of the air outlets 225 provided is able to heat the parts of the body covered with the clothing 210. The arrangement and association of the welds 240 interconnecting the two foils 211, 311 is such that the individual portions of the clothing 210 cannot widen in bag-like manner on blowing in hot air.

The material used for making the article of clothing 210 is air-tight and water-tight. The amount of perspiration produced by the clothing wearer is reduced or even completely eliminated by the hot air supplied to the body and the leading off through openings 250. If the air supply is interrupted, e.g. when the wearer of such clothing reaches the end of his journey, perspiration can be formed, but this is avoided through openings 250. As the article of clothing can also be worn under the normal clothing, it is possible to achieve an air balance, temperature balance and air circulation by means of openings 250. Openings 250 provided in welded portions 240 can be circular or rectangular. The welded portions 240 are correspondingly formed in this area, so that an annular weld 245 is maintained adjacent to each opening 250.

An article of clothing 210 constructed in this way can be manufactured very inexpensively, because it only consists of two zonally interconnected plastic foils and an additional thermally insulating material such as a lining or the like is rendered superfluous. The hot air-carrying duct system 220 can also function if parts of the duct system are disconnected, e.g. when using the article of clothing with seats having a back rest. Although in this area, the air circulation in the inner area 213 of clothing is interrupted, the hot air circulation in the remainder of the inner area 213 is in no way impaired.

The flexible hot air supply connection 230 can contain a shut-off valve, not shown in the drawing, which makes it possible for the wearer of the clothing to regulate the quantity of hot air supplied and also to interrupt this supply if no body heating is required. Such a shut-off valve can also be provided with an external air supply connection and can be controllable in such a way that hot air can be so mixed with cold air that a pleasant temperature results for the wearer.

If article of clothing 210 is constructed as an inner part, it can be provided in per se known manner with connecting devices, not shown in the drawing, for fixing the inner part e.g. in inner lining-like manner into an article of clothing such as a jacket, parka, overcoat, etc. The fastening means can be constituted by push buttons or studs or zip fasteners or other suitable connecting means.

Like the article of clothing 210, the inner part can be provided with sleeves. The sleeves are then constructed in corresponding manner to the article of clothing 210.

What is claimed is:

1. An apparatus for heating persons, comprising a hot air generator arranged to be supplied with heat from an internal combustion engine, an article of clothing including an air carrying system with hot air outlet openings in said article of clothing facing the body of the person to be heated, said air carrying system is connected to said hot air generator, said article of clothing is made of an air-impermeable material and comprises at least two layers including an inner layer closer to the body of the person to be heated and an outer layer, said inner layer and outer layer each having an inner surface facing the inner surface of the other, said inner and outer layers are connected together at spaced locations and between the spaced locations form air ducts forming said air carrying system, wherein the improvement comprises that said inner and outer layers of said article of clothing are welded together at the spaced locations, said air outlet openings facing the body of the person to be heated are located in said inner layer adjacent to the location where said inner and outer layers are welded together, a hot air inlet nozzle opens into said air carrying system into the space between said inner and outer layers with said nozzle extending through one of said inner and outer layers, an insulating layer extending around the air inlet nozzle on the inside surface of the one of the inner and outer layers through which said air inlet nozzle extends into the space between said layers, and an insulating layer on the inside surface of the other one of said inner and outer layers located opposite the opening from said air inlet nozzle.

2. An apparatus according to claim 1, wherein the hot air generator is constructed as a heat exchanger connected to the exhaust pipe of the internal combustion engine.

3. An apparatus according to claim 1, wherein said hot air generator is a heat exchanger comprising two half-shells pivotable about a hinge and interconnectable by means of a clamping device.

4. An apparatus according to claim 3, wherein a segment of the inlet is associated with each half-shell.

5. An apparatus according to claim 3, wherein a conical insert open in the direction of travel of the vehicle is formed on the heat exchanger and by means of which the inflowing air is supplied to the article of clothing in the opposite direction to the exhaust through a deflection chamber having heat exchanger ribs or the like firstly via deflection areas formed in the end portion of the heat exchanger remote from the inlet.

6. An apparatus according to claim 5, wherein a semi-circular segmental portion of the deflection chamber is associated with each half-shell.

7. An apparatus according to claim 1, wherein said hot air generator has a conical air inlet, and a blower is arranged at the air inlet of the hot air generator.

8. An apparatus according to claim 7, wherein the delivery quantity of the blower is adjustable by means of a regulating device.

9. An apparatus according to claims 7 or 8, wherein the blower is arranged in the conical air inlet of the heat air generator.

10. An apparatus according to claim 1, wherein the article of clothing comprises an outer shell and an inner shell, zonally interconnected with one another, whilst forming air ducts making up said air carrying system.

11. An apparatus according to claim 10, wherein the air ducts are constructed as wide ducts with air passage openings arranged in the inner shell.

12. An apparatus according to claim 10, wherein the air carrying system has a central connecting piece for connection to the flexible line and connecting pieces for connecting to a helmet, cap or the like, gloves and boots.

13. An apparatus according to claim 10, wherein the air carrying system has a supply air duct arrangement arranged so as to overlap an outlet air duct arrangement in the article of clothing and wherein the outlet air duct arrangement is connected to an outlet air connection perforating the article of clothing.

14. An apparatus according to claim 13, wherein the outlet air connection is connected by means of a flexible line to an outlet air injector subject to the action of an air stream.

15. An apparatus according to claim 10, wherein the article of clothing is constructed as an inner part with or without sleeves which is connectable therewith and which may or may not have leg portions.

16. An apparatus according to claim 1, wherein the air duct of said air carrying system comprises a main duct integrated into the article of clothing in the form of a coverall and extending over the arm portions, leg portions and central portions of the article of clothing and distribution ducts are connected to said main duct generally extending at the right angles thereof up to the air passage openings.

17. An apparatus according to claim 1, wherein said inner layer and outer layer is formed of weldable plastics foil or a fabric lined with a plastics foil, the two layers are edge-welded forming a closed inner area.

18. An apparatus according to claim 1, wherein the inner and outer layers are provided with a reinforcing foil in the welded locations and in the hot air inlet nozzle location.

19. An apparatus, as set forth in claim 1, wherein a continuous opening is provided through said inner and outer layers in the region where said layers are welded together with said welded layers forming an annular welded section extending around the opening through said layers.

20. An apparatus, as set forth in claim 1, wherein said inner and outer layers are welded together in a puncti-form manner.

21. An apparatus, as set forth in claim 1, wherein said inner and outer layers are welded together in web-like sections.

22. An apparatus, as set forth in claim 1, wherein said inner and outer layers are welded together in cross-shaped web-like sections.

* * * * *

UNITED STATES PATENT AND TRADEMARK OFFICE
CERTIFICATE OF CORRECTION

PATENT NO. : 4,418,745
DATED : Dec. 6, 1983
INVENTOR(S) : Oskar Wilhelm Konrad Roehr It is certified that error appears in the above-identified patent and that said Letters Patent is hereby corrected as shown below:

In the heading of the Patent [30] should read as follows:

[30]  Foreign Application Priority Data

Oct. 11, 1980 [DE]  Fed. Rep. of Germany.....8027178
Oct. 15, 1980 [DE]  Fed. Rep. of Germany.....8027524
Nov.  7, 1980 [DE]  Fed. Rep. of Germany.....8029729
Nov. 25, 1980 [DE]  Fed. Rep. of Germany.....8031329

Signed and Sealed this

Sixth Day of March 1984

[SEAL]

Attest:

GERALD J. MOSSINGHOFF

*Attesting Officer*  *Commissioner of Patents and Trademarks*